United States Patent Office.

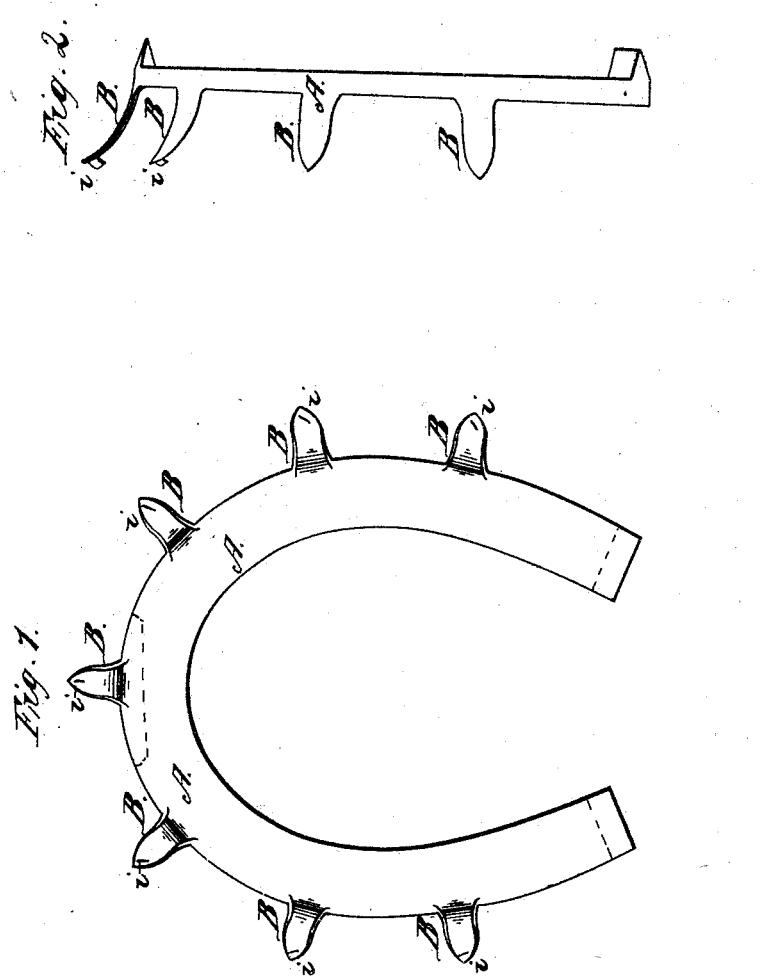

WARNER HINDS, OF WORCESTER, MASSACHUSETTS.

*Letters Patent No. 76,449, dated April 7, 1868.*

IMPROVEMENT IN HORSE-SHOES.

*The Schedule referred to in these Letters Patent and making part of the same.*

TO ALL WHOM IT MAY CONCERN:

Be it known that I, WARNER HINDS, of the city and county of Worcester, State of Massachusetts, have invented certain new and useful Improvements in Horse-Shoes; and I do hereby declare the following to be a full, clear, and exact description of the same, due reference being had to the accompanying drawings, by the letters of reference marked thereon.

The object of my invention is to secure the shoe to the hoof, in such a manner that whilst it may be securely held to the hoof when on, I am enabled to construct it of one piece, in a light, economical form, without either nails, screws, joints, or any separate pieces, to become loose by wear.

To these ends, its nature consists in forming the shoe by casting, rolling, swaging, or forging, with several ribs or arms, to extend up outside the hoof, and having suitable clinches, to drive into the hoof, to hold it firmly, said arms being capable of being bent back and forth, to put on the shoe.

Figure 1 is a view of my improved horse-shoe,

Figure 2 is a side view of the same—

The same parts being indicated by the same letter in both.

A is the sole or body of the shoe, (which may be of any suitable form and style of calking,) and from it rise the arms B B, (at such points as found best to secure it to the hoof,) extending up a short distance, and each furnished with one or more clinches, $i$ $i$, which are made thin and sharp, and so filed as to turn and clinch when driven into the hoof, and may be set in such position as found best.

In setting the shoe, the hoof is pared even and true on its bottom, the arms of the shoe bent off, and shallow places filed in the edge of the hoof, where the arms come; then, setting the foot down, with the shoe in place, and the weight of the horse brought to bear on it, the arms are driven up close, and hold it securely; or the shoe may be heated and bedded on the hoof, and then the arms closed up and clinched as before, the projecting edge of the hoof, between the arms, being smoothed off, to leave neat work. This gives a natural or working condition of the hoof and shoe when the arms are clinched, and the growth of the hoof tends to increase rather than diminish the hold of the shoe, and compensate for the jarring of use.

I am aware that shoes have been made with arms, screws, clips, &c., &c., to secure them; these I do not claim, but

What I claim as new, and desire to secure by Letters Patent, is—

The horse-shoe, complete in one piece, formed by the combination of the sole A, with or without calks, the arms B B and clinches $i$ $i$, when constructed and operating in the manner and for the purposes above set forth and described.

WARNER HINDS,

Witnesses:
J. W. ALLEN,
JAMES G. ARNOLD.